United States Patent
Ratilla et al.

(10) Patent No.: US 9,846,609 B2
(45) Date of Patent: Dec. 19, 2017

(54) SYSTEM AND METHOD FOR TESTING CONFIGURATION AND OPERATION OF I/O DEVICES

(71) Applicant: YOKOGAWA ELECTRIC CORPORATION, Musashino-shi, Tokyo (JP)

(72) Inventors: Jasper Bryan Sale Ratilla, Singapore (SG); Wei Hong Weng, Singapore (SG)

(73) Assignee: YOKOGAWA ELECTRIC CORPORATION, Tokyo (JP)

( * ) Notice: Subject to any disclaimer, the term of this patent is extended or adjusted under 35 U.S.C. 154(b) by 96 days.

(21) Appl. No.: 14/966,740

(22) Filed: Dec. 11, 2015

(65) Prior Publication Data
US 2017/0168883 A1   Jun. 15, 2017

(51) Int. Cl.
*G06F 11/00*  (2006.01)
*G06F 11/07*  (2006.01)

(52) U.S. Cl.
CPC ........ *G06F 11/079* (2013.01); *G06F 11/0745* (2013.01); *G06F 11/0751* (2013.01)

(58) Field of Classification Search
CPC . G06F 11/079; G06F 11/0745; G06F 11/0751
See application file for complete search history.

(56) References Cited

U.S. PATENT DOCUMENTS

| | | | | |
|---|---|---|---|---|
| 5,418,909 A | * | 5/1995 | Jackowski | ............ G06F 13/126 710/15 |
| 2005/0195736 A1 | * | 9/2005 | Matsuda | ................ H04L 49/357 370/216 |
| 2008/0189441 A1 | * | 8/2008 | Jundt | .................... G05B 19/042 710/3 |
| 2010/0149997 A1 | * | 6/2010 | Law | ................... G05B 19/4185 370/248 |
| 2013/0080822 A1 | * | 3/2013 | Compton | ............ G06F 11/0745 714/3 |
| 2015/0233791 A1 | | 8/2015 | Ratilla et al. | |

FOREIGN PATENT DOCUMENTS

GB     2483972 A      3/2012

OTHER PUBLICATIONS

Extended European Search Report dated Jun. 20, 2017, issued in counterpart application No. 16187959.8. (6 pages).

* cited by examiner

*Primary Examiner* — Philip Guyton
(74) *Attorney, Agent, or Firm* — Westerman, Hattori, Daniels & Adrian

(57) ABSTRACT

The present invention provides methods, systems and computer program products for detecting a configuration error or operating error corresponding to an input/output (I/O) device. The I/O device comprises a plurality of I/O points configured to establish a combined I/O channel between said I/O device and a field device, said combined I/O channel comprising a primary I/O channel and at least one secondary I/O channel.

19 Claims, 11 Drawing Sheets

SYSTEM AND METHOD FOR TESTING CONFIGURATION AND OPERATION OF I/O DEVICES

FIELD OF THE INVENTION

The present invention relates to testing of industrial control systems. In particular, the invention provides systems, methods and computer program products for testing configuration or operation of input/output (I/O) devices and their interconnections with field devices within control systems such as process control systems and process automation systems.

BACKGROUND

Industrial control systems comprise one or more controllers coupled with at least one Human Machine Interface (HMI) over a network or other communication system. The one or more controllers are linked to field devices or peripherals that gather data and perform control tasks—for example sensors, actuators, motors, console lights, switches, valves and contactors.

Control systems also include I/O devices which connect controllers to field devices, and which perform an interface function between the two. The input component of an I/O device may comprise one or more signal conditioning or signal conversion circuits, which enable conditioning and/or conversion of data signals received from a field device into logic signals capable of interpretation by the corresponding controller. The output component of an I/O device may comprise one or more signal conversion circuits configured to convert control signals from the controller into digital or analog signals that can be used to control various field devices.

Depending on type and model of a field device in use, corresponding input signals to, or output signals from such field device can vary significantly. Owing to limitations of existing technology, prior art control systems required a compatible I/O device to be selected and implemented for every different field device type or signal type.

FIG. 1A illustrates an exemplary control system 100 incorporating prior art I/O devices. Control system 100 includes human interface station (HIS) 102 which comprises an operator or user interface that is communicably coupled with field controls stations (FCS) 104 and 106. Each FCS comprises a controller that performs control computation functions for one or more function blocks within the control system, and which controls I/O functions for field devices.

In the illustration of FIG. 1A, FCS 104 includes field control unit (FCU) 108—which implements the control functions of FCS 104. FCS 104 additionally includes a plurality of node interface units (NIU) 110a to 110d. Each NIU 110a to 110d comprises an interface that communicates with and enables field control unit 108 to communicate with I/O devices (I/OD) 112a to 112c, and with field devices (FD) 114a or 114b that are connected to an NIU through such I/O device(s). The NIU may additionally include an interface that enables it to communicate with another NIU. It would be understood that FCS 106 may have a configuration similar to FCS 104.

As illustrated in FIG. 1A, each of NIU 110a, 110b and 110c are communicably coupled with I/O device 112a, 112b and 112c respectively. Of these, I/O devices 112a and 112b are respectively coupled with field device (FD) 114a and 114b. I/O device 112c remains available for coupling with a field device. Likewise, NIU 110d remains available for coupling with an I/O device and/or a corresponding field device.

Recent advances in I/O device technology have resulted in development of versatile I/O devices that are capable of interfacing with and processing I/O signal types. Stated differently, the new I/O devices accommodate multiple I/O signal types (and are therefore compatible with multiple field device types) and are capable of functioning as universal I/O and signal conditioners. Additionally, a single advanced I/O device of this type may be capable of being configured to simultaneously couple with one or more analog input field devices, analog output field devices, digital input field devices, and digital output field devices.

In one implementation, the recent I/O devices include multiple types of signal conditioners/converters on a single (or unified) baseplate, which enables flexible configuration and assignment of the I/O device so as to accommodate any one of a plurality of different field device types. These advanced I/O devices are also configured to have multiple I/O points, each I/O point being configured to function as an interface point for an I/O channel established between a field device and the I/O device.

The ability to bind multiple field devices to a single I/O device lowers the overall device footprint, and improves cost efficiencies. Additionally, the ability to flexibly bind a single I/O device type to multiple field device types results in significantly faster project completion without compromising quality. FIG. 1B illustrates an advanced I/O device (I/OD) 116 of the type described above—which I/OD 116 is communicably coupled to multiple field devices (FD) 118a to 118d. It would be understood that the total number of field devices that may be connected to a single I/O device of the type illustrated in FIG. 1B is limited by the maximum number of I/O points provided in the I/O device.

The availability of multiple I/O points in a single I/O device provides the ability to simultaneously establish multiple I/O channels, and additionally to combine multiple I/O channels into a single combined I/O channel, which combined I/O channel may be assigned or communicably connected to a field device. In an embodiment, the combination of multiple I/O channels may be achieved by configuring multiple I/O points within an advanced I/O device in a manner such that the individual I/O channels established at said multiple I/O points behave as a functionally combined I/O channel.

By way of example, multiple digital output channels of an I/O device may be combined into a single digital output channel to increase an output current delivered to a field device. In a more specific example, two single digital output channels, each respectively capable of carrying an output current of 0.67 amperes, may be combined to deliver an output current of approximately 1.3 amperes to a field device. In another example, three single digital output channels, each capable of carrying an output current of 0.67 amperes, may be combined to deliver an output current of approximately 2 amperes to a field device.

Similarly (i) multiple digital input channels associated with an I/O device may be combined into a single digital input channel (ii) multiple analog output channels associated with an I/O device may be combined into a single analog output channel and (iii) multiple analog input channels associated with an I/O device may be combined into a single analog input channel.

The ability to combine multiple channels established by an I/O device into a combined single I/O channel has presented a previously unanticipated difficulty in testing whether the I/O points associated with such combined channels have been appropriately configured, and whether the resulting combined channels are operating correctly.

Since a combined I/O channel comprises more than one individual component channel, conventional testing of a combined I/O channel requires testing of each component channel separately. FIG. 2 illustrates a flowchart setting out conventionally understood steps for ascertaining whether a combined I/O channel is operating correctly.

A combined I/O channel comprises a primary channel and one or more secondary channels. As illustrated in FIG. 2, conventional testing of a combined I/O channel involves at step 202, performing a signal check across the primary channel. Thereafter, step 204 comprises ascertaining whether any secondary channels associated with the primary channel remain to be tested, and if so, performing a signal check on the untested secondary channel at step 206. The method repeats steps 204 and 206 until signal checks have been completed on the primary channel as well as on all secondary channels associated with the combined I/O channel. Step 208 thereafter determines the status of the combined I/O channel based on results of testing of each of the primary and secondary channels.

The conventional testing method illustrated in FIG. 2 suffers from multiple drawbacks, including (i) requiring serialized testing and validation of signals on each of the primary and secondary channels—whereas ideally each of the primary and secondary channels should be tested concurrently, (ii) requiring manual comparison and analysis of anticipated signal values against measured values (iii) the signal testing is carried out manually, with the aid of physical sensors or measurement devices (such as a voltmeter, multimeter, ammeter or other sensing device) which is laborious and prone to human measurement and validation errors. Additionally, since this method relies on testing of individual I/O channels, the testing process can only be carried out after all channels between the I/O device and the concerned field device have been established (i.e. after the actual physical, wired or wireless connections have been established).

There is accordingly a need for an automated and accurate system for testing an I/O device configured to implement one or more combined I/O channels, which testing can be carried out even without establishing actual physical connections between the I/O device and the concerned field device.

SUMMARY

The invention provides a method for detecting a configuration error or operating error corresponding to an input/output (I/O) device having a plurality of I/O points configured to establish a combined I/O channel between said I/O device and a field device. The combined I/O channel may comprise a primary I/O channel and at least one secondary I/O channel. The method may comprise (a) receiving an instruction for transmission of a specified signal pattern over the combined I/O channel, (b) responsive to the specified signal pattern, initiating at an I/O point associated with the primary I/O channel within the combined I/O channel, transmission of a primary channel signal over the primary I/O channel, (c) for each secondary I/O channel within the combined I/O channel, initiating at an I/O point associated with said secondary channel, transmission of a secondary channel signal over said secondary I/O channel, (d) receiving a record of signal transmissions initiated or received over the combined I/O channel in response to the specified signal pattern, (e) comparing signal values within the received record of signal transmissions against a predefined set of signal values associated with the specified signal pattern, and (f) detecting a configuration error or operating error based on results of the comparison of signal values.

The received record of signal transmissions may comprise a record of signal transmissions (i) initiated at the I/O point associated with the primary I/O channel within the combined I/O channel and (ii) initiated at each I/O point associated with a secondary channel within the combined I/O channel. The predefined set of signal values associated with the specified signal pattern may comprise a primary I/O channel signal value and at least one secondary I/O channel signal value respectively associated with the specified signal pattern.

The received record of signal transmissions may alternatively comprise a record of signal transmissions received at a receiving device (i) over the primary I/O channel within the combined I/O channel and (ii) over each secondary channel within the combined I/O channel. The predefined set of signal values associated with the specified signal pattern may comprise a primary I/O channel signal value and at least one secondary I/O channel signal value respectively associated with the specified signal pattern.

In another embodiment, the received record of signal transmissions may comprise a record of a signal transmission received at a receiving device over the combined I/O channel. The predefined set of signal values associated with the specified signal pattern may comprise a combined I/O channel signal value associated with the specified signal pattern.

The record of signal transmissions may be generated (i) by the I/O device responsive to initiating transmission of signals over primary or secondary I/O channels within the combined I/O channel, or (ii) by a receiving device responsive to receiving signals transmitted over primary or secondary I/O channels within the combined I/O channel.

In a particular embodiment, the instruction for transmission of the specified signal pattern may be received at an operator interface.

In yet another embodiment, the I/O device may be configured such that each of the primary and secondary I/O channels within the combined I/O channel may comprise a digital output channel, and the combined I/O channel may comprise a combined digital output channel.

In an embodiment of the invention, the signals delivered by the combined I/O channel and the primary and secondary I/O channels within said combined I/O channel may comprise current signals.

The method may further comprise detecting a configuration error or operating error based on results of at least one of fallback testing or disconnection detection testing executed on the primary I/O channel within the combined I/O channel, wherein said detection of configuration error or operating error is independent of fallback testing and disconnection testing executed on any secondary I/O channel within the combined I/O channel.

The invention additionally provides a system for detecting a configuration error or operating error corresponding to an input/output (I/O) device. In an embodiment, the system may comprise an I/O device and a validation engine. The I/O device may comprise a plurality of I/O points configured to establish a combined I/O channel between said I/O device and a field device, said combined I/O channel comprising a primary I/O channel and at least one secondary I/O channel. The validation engine may be configured to (a) receive an instruction for transmission of a specified signal pattern over the combined I/O channel, (b) responsive to the specified signal pattern, initiate at an I/O point associated with the primary I/O channel within the combined I/O channel, transmission of a primary channel signal over the primary I/O channel, (c) for each secondary I/O channel within the combined I/O channel, initiate at an I/O point associated with said secondary channel, transmission of a secondary channel signal over said secondary I/O channel, (d) receive a record of signal transmissions initiated or received over the combined I/O channel in response to the specified signal pattern, (e) compare signal values within the received record of signal transmissions against a predefined set of signal values associated with the specified signal pattern, and (f) detect a configuration error or operating error based on results of the comparison of signal values.

In an embodiment of the above system, the received record of signal transmissions may comprise a record of signal transmissions (i) initiated at the I/O point associated with the primary I/O channel within the combined I/O channel and (ii) initiated at each I/O point associated with a secondary channel within the combined I/O channel. The predefined set of signal values associated with the specified signal pattern may comprise a primary I/O channel signal value and at least one secondary I/O channel signal value respectively associated with the specified signal pattern.

The received record of signal transmissions may comprise a record of signal transmissions received at a receiving device (i) over the primary I/O channel within the combined I/O channel and (ii) over each secondary channel within the combined I/O channel. The predefined set of signal values associated with the specified signal pattern may comprise a primary I/O channel signal value and at least one secondary I/O channel signal value respectively associated with the specified signal pattern.

The received record of signal transmissions may comprise a record of a signal transmission received at a receiving device over the combined I/O channel. The predefined set of signal values associated with the specified signal pattern may comprise a combined I/O channel signal value associated with the specified signal pattern.

In accordance with an embodiment of the above invention, the record of signal transmissions may be generated (i) by the I/O device responsive to initiating transmission of signals over primary or secondary I/O channels within the combined I/O channel, or (ii) by a receiving device responsive to receiving signals transmitted over primary or secondary I/O channels within the combined I/O channel.

In a particular embodiment, the instruction for transmission of the specified signal pattern may be received at an operator interface.

The I/O device may be configured such that each of the primary and secondary I/O channels within the combined I/O channel may comprise a digital output channel and the combined I/O channel may comprise a combined digital output channel.

In an embodiment, the signals delivered by the combined I/O channel and the primary and secondary I/O channels within said combined I/O channel may be current signals.

In another embodiment of the invention, the system may further comprise detecting a configuration error or operating error based on results of at least one of fallback testing or disconnection detection testing executed on the primary I/O channel within the combined I/O channel, wherein said detection of configuration error or operating error is independent of fallback testing and disconnection testing executed on any secondary I/O channel within the combined I/O channel.

The invention additionally provides computer program products configured to implement the methods and system described above and in further detail throughout the specification.

BRIEF DESCRIPTION OF THE ACCOMPANYING DRAWINGS

Figure 6:
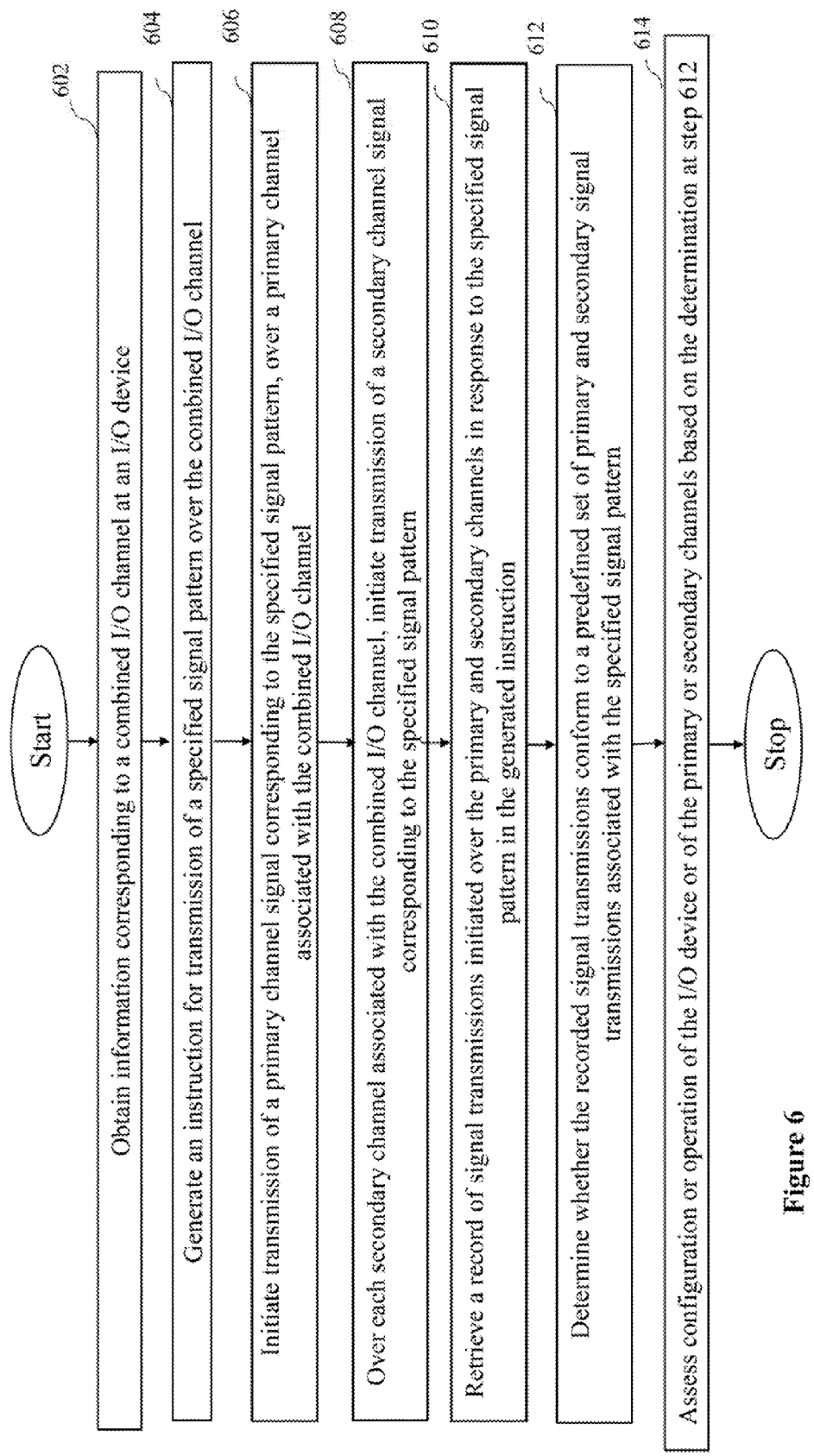
Figure 8:
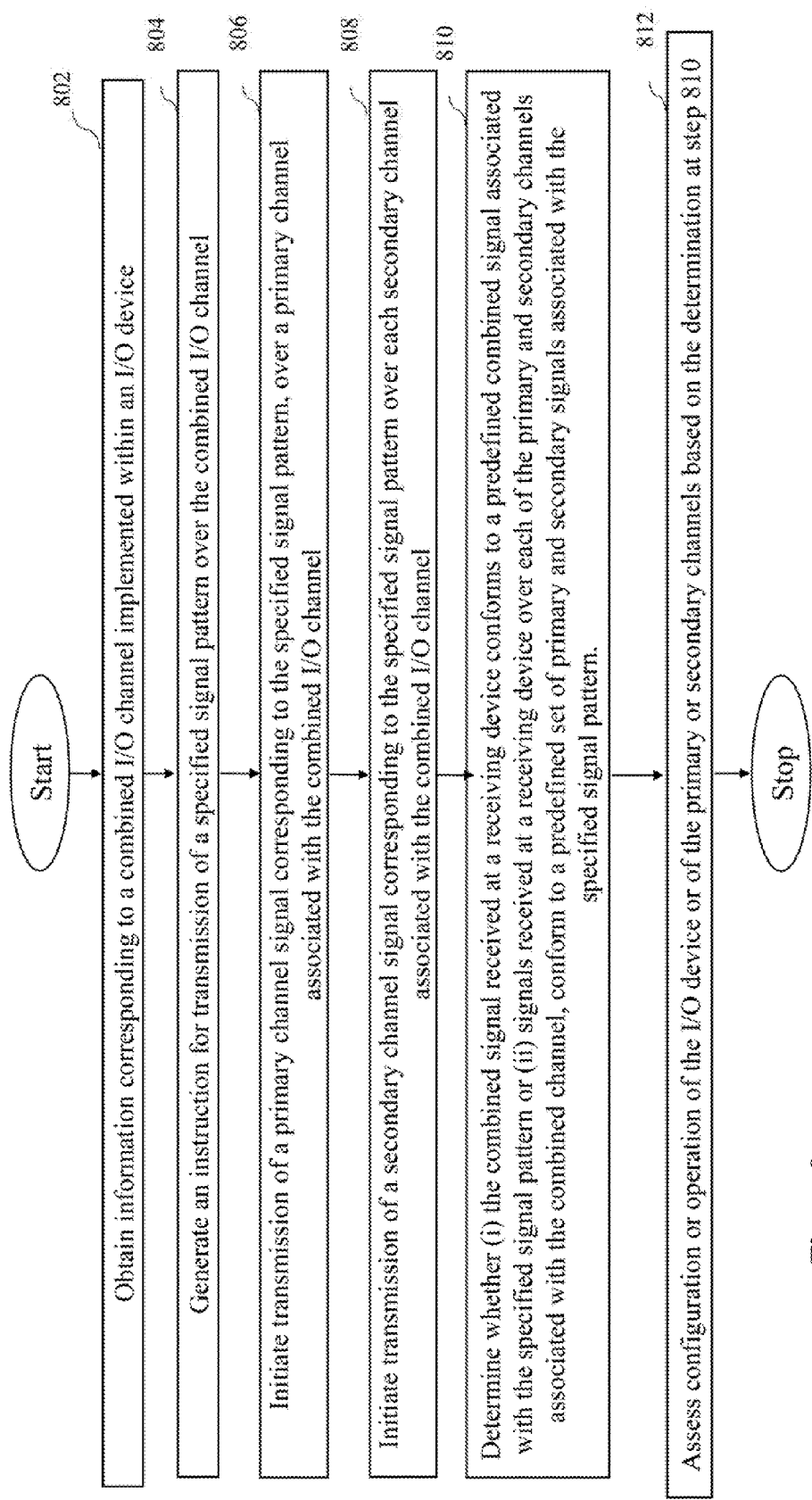

FIGS. 6 and 8 provide flowcharts illustrating methods of testing configuration and/or operation of a configurable I/O device.

Figure 9:
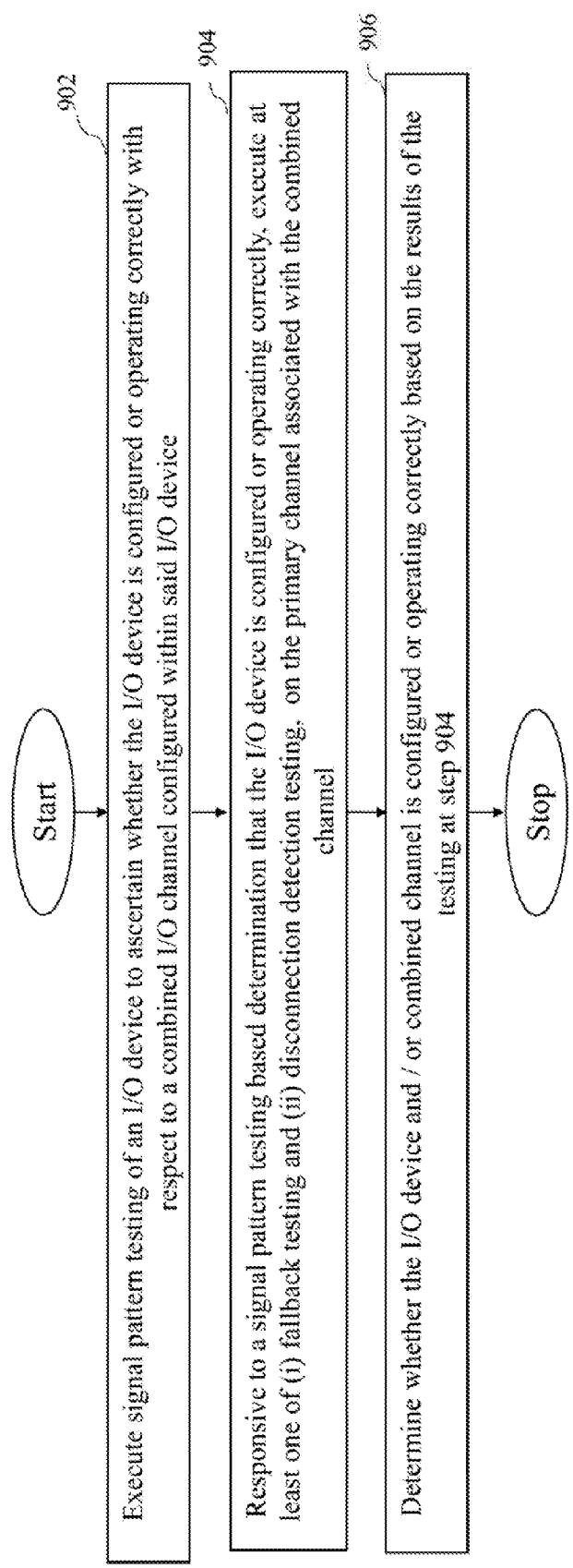

FIG. 9 illustrates a flow chart describing a method for executing confirmatory testing of one or more combined I/O channels established at a configurable I/O device.

Figure 10:
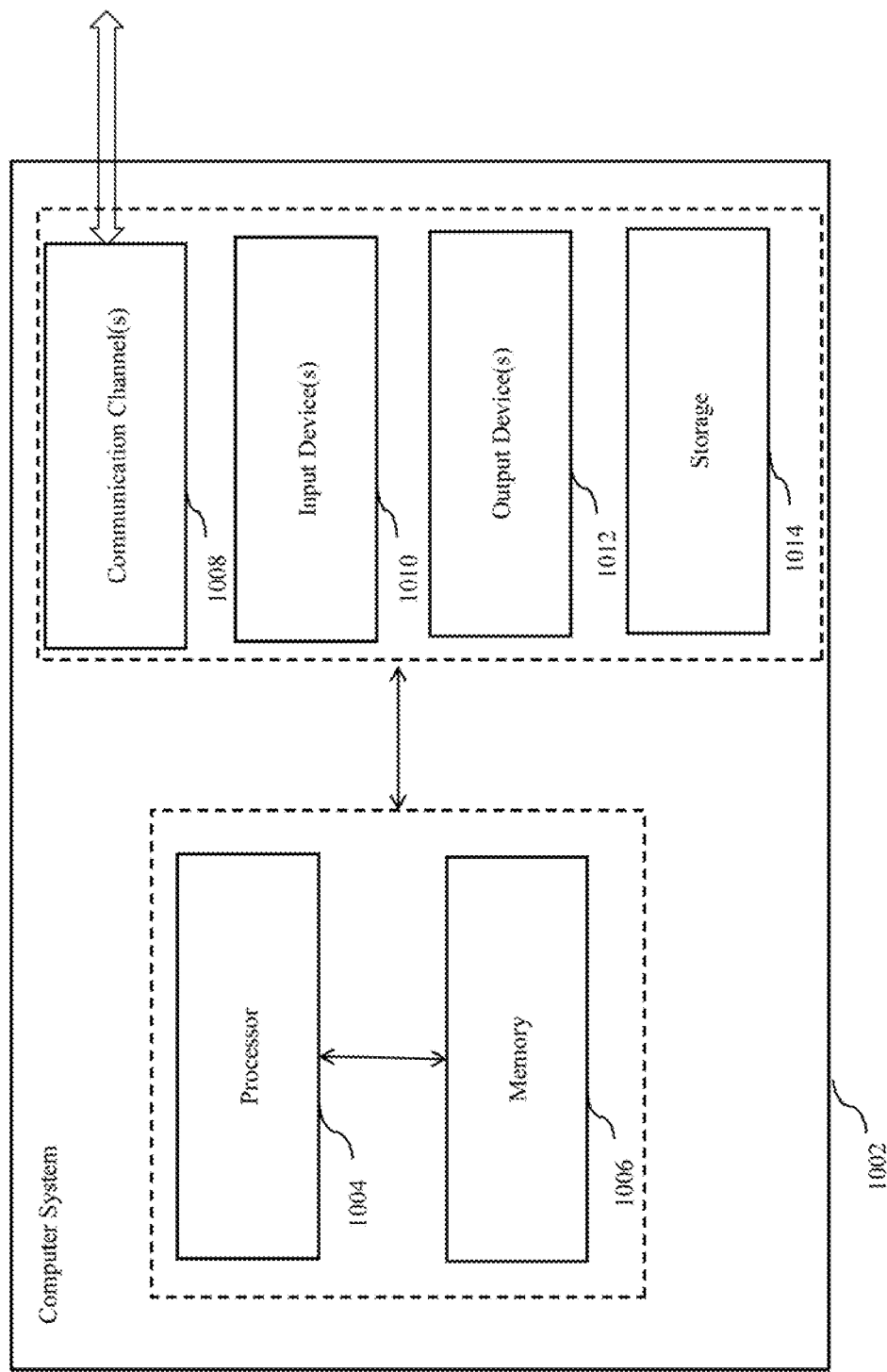

FIG. 10 illustrates an exemplary computing system for implementing the present invention.

DETAILED DESCRIPTION

For the purposes of the present invention, the term "configurable I/O device", shall mean an I/O device (i) having a plurality of I/O points, each configured to establish an I/O channel, and (ii) which is capable of being configured to ensure that I/O channels corresponding to two or more of the plurality of I/O points are functionally combined into a single combined I/O channel, which combined I/O channel can be assigned to a single field device.

For the purposes of the invention, "configuration error" shall mean an error in configuration of a configurable entity.

For the purposes of the present invention, "I/O channel" shall mean a communication channel established between an I/O device and a field device.

For the purposes of the present invention, "I/O point" shall mean an interface point within an I/O device, which interface point enables an I/O channel to be established between the I/O device and a field device.

For the purposes of the invention, "operating error" shall mean an error in operation of an operating entity.

Figure 1A:
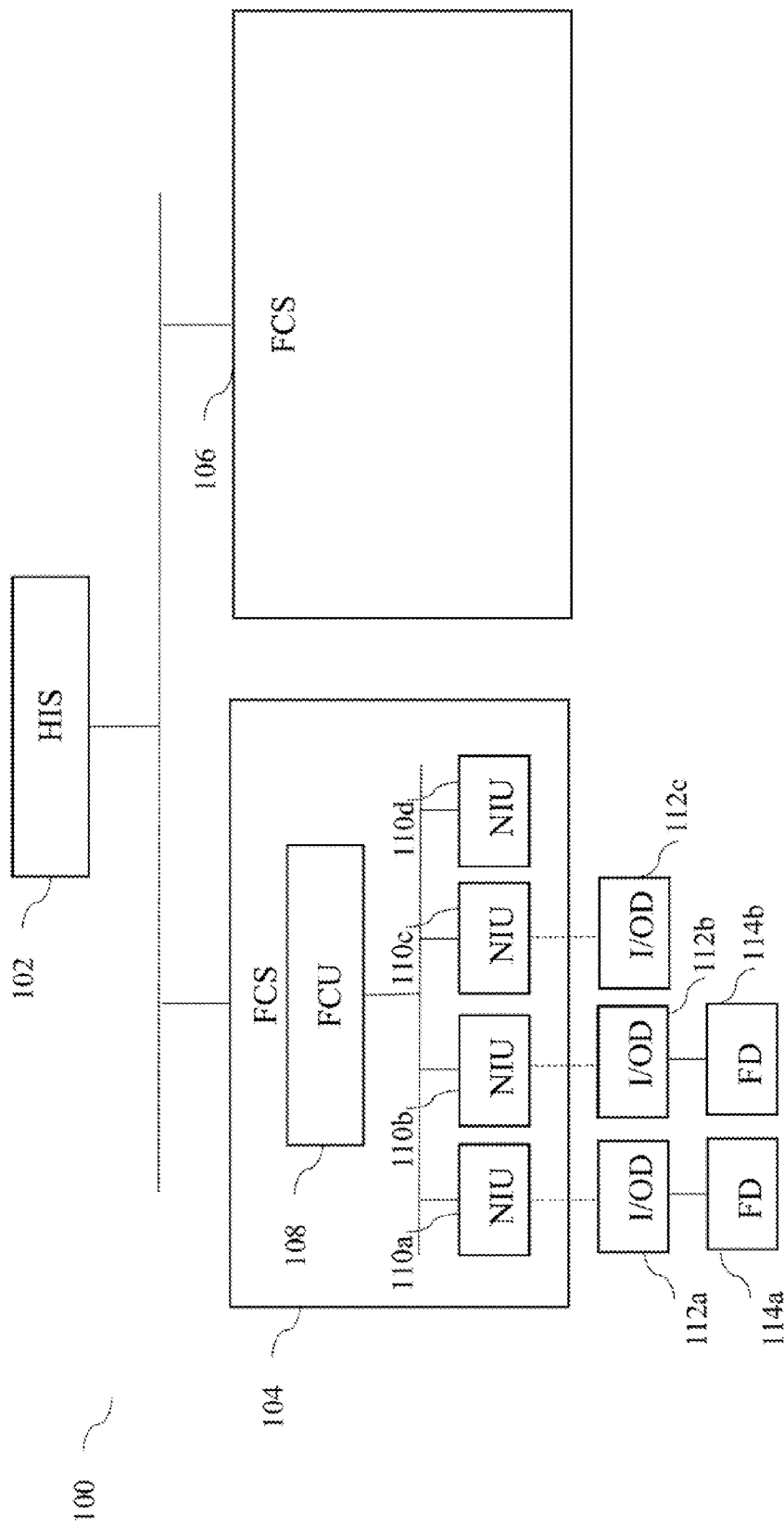
FIG. 1A illustrates an exemplary control system 100 incorporating prior art I/O devices.
Figure 1B:
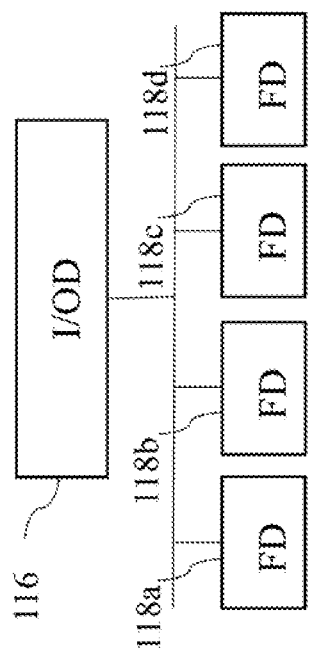
FIG. 1B illustrates a configurable I/O device of the type implemented for the purposes of the present invention.
Figure 2:
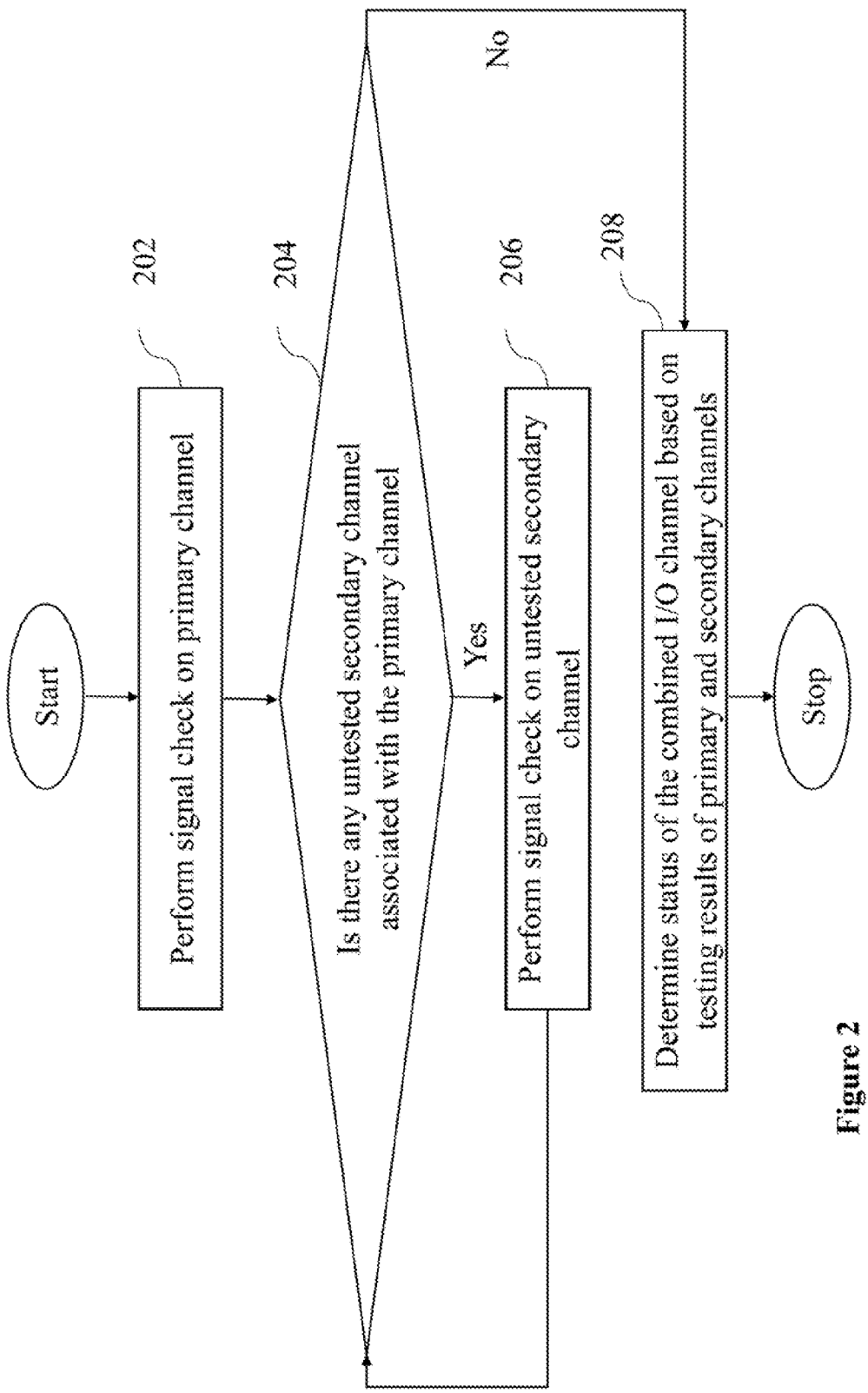
FIG. 2 illustrates a flowchart setting out conventionally understood steps for ascertaining whether a combined I/O channel is operating correctly.
Figure 3:
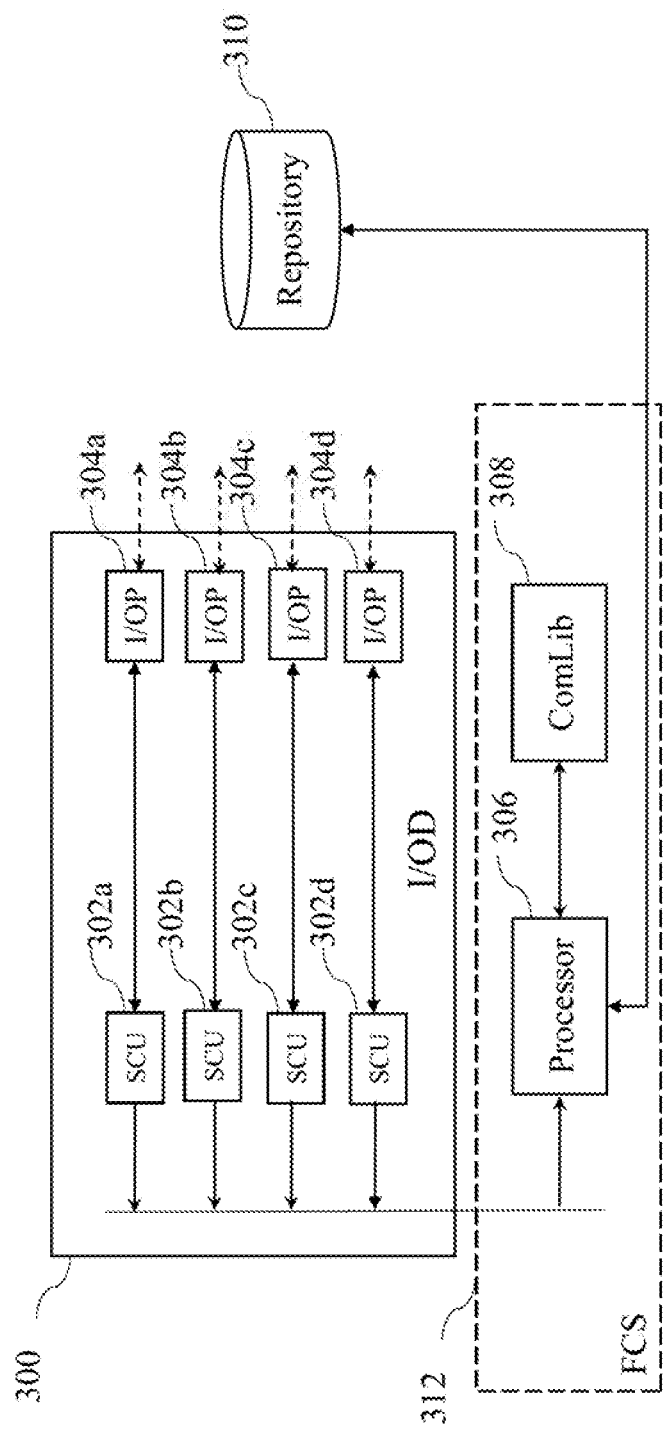
FIG. 3 illustrates operation of a configurable I/O device in accordance with the invention.

FIG. 3 illustrates operation of a configurable I/O device in accordance with the teachings of the invention. Configurable I/O device 300 comprises a plurality of I/O points (I/OP) 304a to 304d, each of which is capable of serving as an interface endpoint of an I/O channel established between the I/O device and a field device. Each I/O point 304a to 304d is communicably coupled to a corresponding signal conditioning/conversion unit (SCU) 302a to 302d. Configurable I/O device 300 is configured to record information corresponding to (i) each signal transmission (or each initiation of signal transmission) from any I/O point within the I/O device, and/or (ii) each signal received at any I/O point within the I/O device. In the illustrated embodiment, this information may be recorded by means of a processor 306 and/or a communication library (ComLib) 308, which may be internal or external to configurable I/O device 300. In an embodiment, processor 306 and ComLib 308 may comprise part of a field control station (FCS) 312 with which the configurable I/O device is coupled.

The information recorded by I/O device (by means of processor 306 and/or communication library 308) may be stored in repository 310. In an embodiment of the invention, this information may comprise one or more of, signal type, signal value, I/O point at which the signal is transmitted or received, sender and/or intended recipient of the signal, and a time stamp corresponding to signal transmission (or initiation of signal transmission) or signal receipt.

The present invention provides systems, methods and computer programs for testing configuration and operation of a configurable I/O device of the type generally described above, which has been configured to combine a plurality of I/O channels into a combined I/O channel for assignment to a single field device. The invention additionally enables testing of the combined channel after connection with a corresponding field device.

Figure 4:
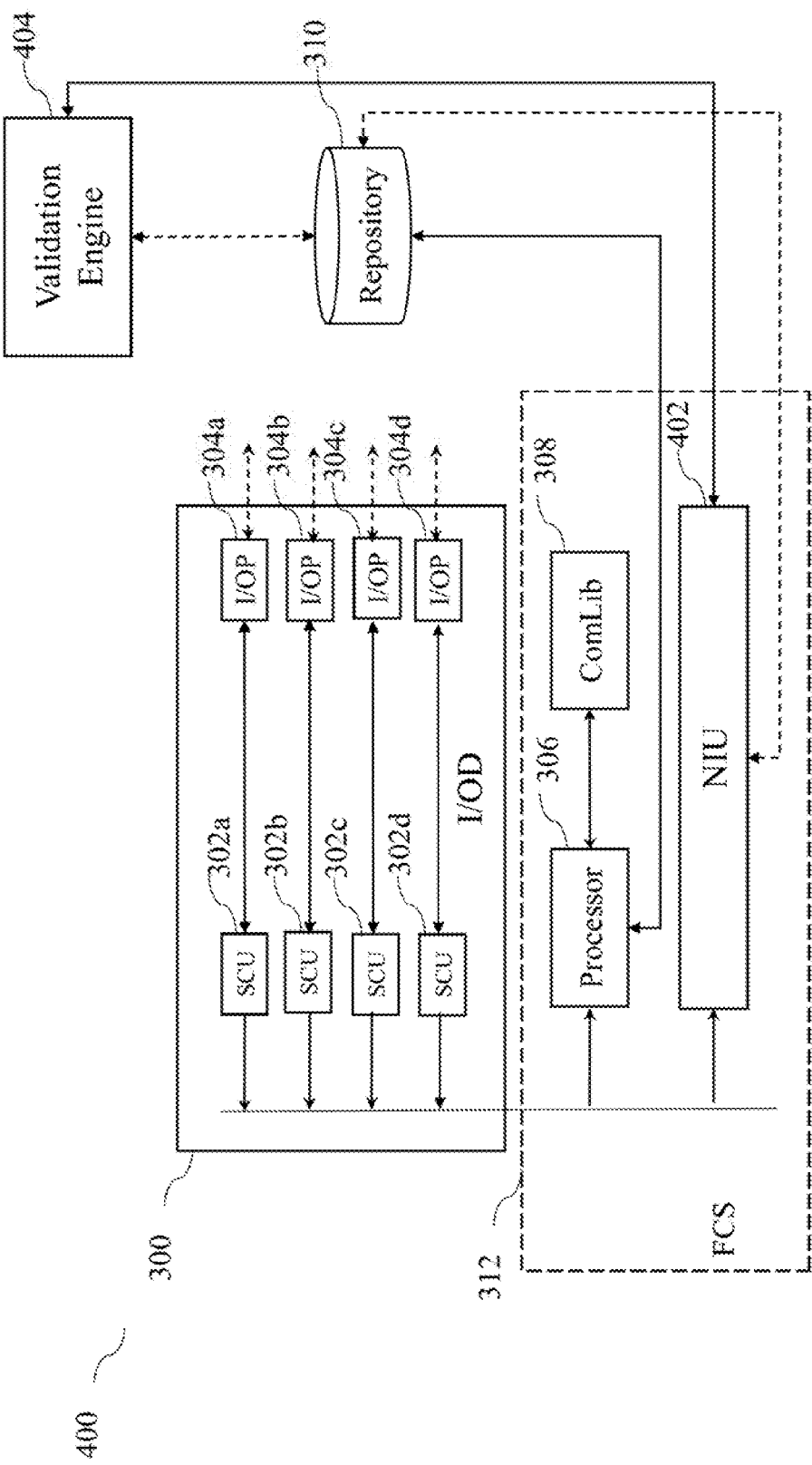
FIG. 4 illustrates a system implementation of the present invention.

FIG. 4 illustrates a system implementation 400 of the present invention, based on the combination of configurable I/O device 300, field control station 312 and repository 310 as more generally illustrated in FIG. 3. It will be observed from FIG. 4 that the system implementation may additionally comprise node interface unit 402 disposed within field control station 312, and validation engine 404 which are communicably coupled with each other, and one or both of which may additionally be in communication with repository 310. The operation of system implementation 400 will be discussed in further detail in connection with FIGS. 5 to 9.

Figure 5:
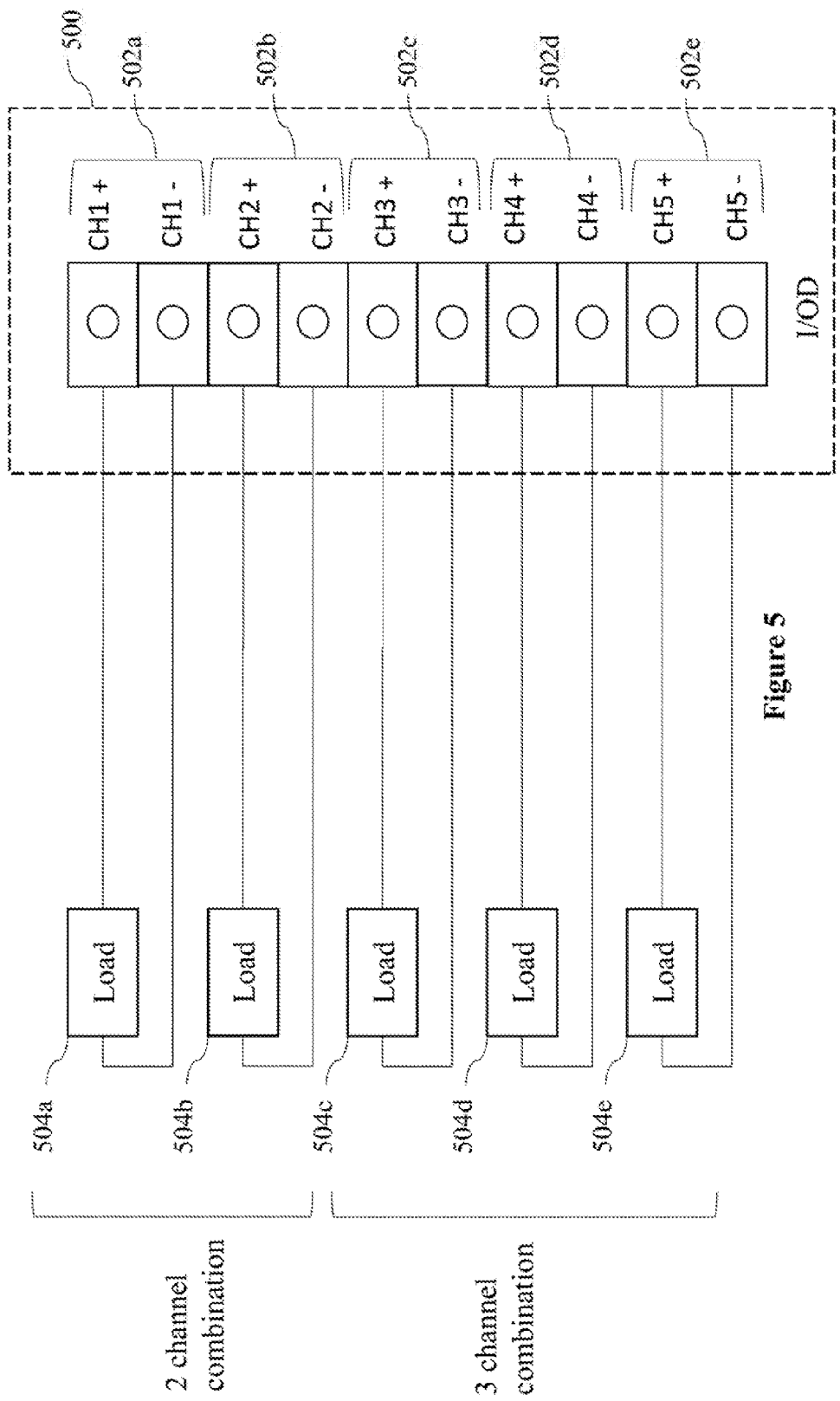
FIGS. 5 and 7 illustrate embodiments of a configurable I/O device where a plurality of I/O points have been configured to generate combined I/O channels.

FIG. 5 illustrates an embodiment of a configurable I/O device 500 according to the present invention, wherein a plurality of I/O channels have been combined to generate combined I/O channels. In the illustrated embodiment, configurable I/O device 500 includes I/O points 502a to 502e. Each I/O point 502a to 502e may be used to establish a corresponding I/O channel between their respective positive terminal ends CH1+, CH2+, CH3+, CH4+ and CH5+ and their respective negative terminal ends CH1−, CH2−, CH3−, CH4− and CH5−, said I/O channels respectively having loads 504a to 504e disposed thereon. In the embodiment illustrated in FIG. 5, I/O points 502a and 502b and their corresponding I/O channels may be combined to establish a first combined I/O channel comprising two single I/O channels. Likewise I/O points 502c, 502d and 502e may be combined to establish a second combined I/O channel comprising three single I/O channels. While the illustrated embodiment is limited to illustrations of dual-channel combinations and tri-channel combinations, it would be understood that the number of I/O channels that may be combined into a single combined I/O channel is dependent on the total number of available I/O channels within I/O device 500 and on the intended end use.

It would be understood that the method of combining I/O channels in accordance with the present invention may be relied on for combining analog input channels, analog output channels, digital input channels and/or digital output channels. In a specific embodiment of the invention, two or more digital output channels may be combined to serve as a single combined digital output channel connected to a single field device. In a preferred embodiment, multiple digital output channels of an I/O device may be combined into a single digital output channel to increase the output current carried to a field device. In one embodiment of the invention, two single digital output channels, each capable of carrying an output current of 0.67 amperes, may be combined to deliver an output current of approximately 1.3 amperes to a field device. In another embodiment, three single digital output channels, each capable of carrying an output current of 0.67 amperes, may be combined to deliver an output current of approximately 2 amperes to a field device.

Information data records identifying I/O points (and their corresponding I/O channels) within an I/O device that have been configured to establish and operate a combined I/O channel may be maintained within a repository (for example repository 310). In an embodiment, such information data records may comprise part of a configuration data record which describes configuration of the concerned I/O device. Information data records within the configuration data record may include one or more of (i) identifiers corresponding to specific I/O points or I/O channels configured to establish a combined I/O channel (ii) number of individual I/O points within the I/O device (or corresponding individual I/O channels) combined to establish the combined I/O channel (iii) an identifier corresponding to the combined I/O channel (iv) information enabling identification of an I/O point corresponding to a primary channel within the combined I/O channel (v) information enabling identification of I/O point(s) corresponding to each secondary channel within the combined I/O channel (vi) predefined signal types, signal patterns or signal values intended for transmission over the combined I/O channel and/or over individual I/O channels within the combined I/O channel and (vii) predefined signal types, signal patterns or signal values intended for transmission over individual I/O channels within the combined I/O channel.

FIG. 6 provides a flowchart illustrating a method of testing configuration and/or operation of a configurable I/O device within the system implementation 400 (that is illustrated in FIG. 4). In an embodiment of the invention, one or more steps of the method of testing may be implemented using a validation engine 404 of the type illustrated in FIG. 4.

Step 602 comprises obtaining information corresponding to a combined I/O channel within an I/O device. In an embodiment of the invention, step 602 comprises retrieving from among information data records stored within repository 310, one or more of (i) identifiers corresponding to specific I/O points or I/O channels configured to establish a combined I/O channel (ii) number of individual I/O points within the I/O device (or corresponding individual I/O channels) combined to establish the combined I/O channel (iii) an identifier corresponding to the combined I/O channel (iv) information enabling identification of an I/O point corresponding to a primary channel within the combined I/O channel (v) information enabling identification of I/O point(s) corresponding to each secondary channel within the combined I/O channel and (vi) predefined signal types, signal patterns or signal values intended for transmission over the combined I/O channel and/or over individual I/O channels within the combined I/O channel.

Step 604 comprises generating (or receiving) an instruction for transmission of a specified signal pattern over the combined I/O channel. In an embodiment of the invention, the specified signal pattern is a signal pattern capable of being transmitted over the combined I/O channel and/or over individual I/O channels within the combined I/O channel (which signal pattern may have been selected based on information retrieved at step 602).

Step 606 comprises initiating transmission of a primary I/O channel signal over a primary I/O channel within the combined I/O channel. Transmission of the primary I/O channel signal may be initiated at an I/O point associated with a primary I/O channel. In an embodiment of the invention, identification of the primary I/O channel and/or determination of signal values for the transmitted primary I/O channel signal may be based on information obtained at step 602.

Step 608 comprises initiating transmission of secondary I/O channel signal(s) over each secondary I/O channel within the combined I/O channel. In an embodiment of the invention the primary I/O channel signal and each secondary I/O channel signal associated with the specified signal pattern may have an identical value. In another embodiment, one or more secondary I/O channel signals associated with the specified signal pattern may have a value different from the primary I/O channel signal associated with the specified signal pattern. Transmission of each secondary I/O channel signal may be initiated at an I/O point associated with a secondary I/O channel. In an embodiment of the invention, identification of each secondary I/O channel and/or determination of signal values for the transmitted secondary I/O channel signal may be based on information obtained at step 602.

Step 610 thereafter comprises retrieving a record of signal transmissions initiated over the primary and secondary I/O channels in response to the specified signal pattern provided within the instruction generated at step 604. In an embodiment of the invention, said record of signal transmissions may have been generated by means of processor 306 and/or communication library 308 in the manner previously described in connection with FIG. 3—which record of signal transmission may be retrieved from repository 310.

Step 612 thereafter comprises determining whether the recorded values of signal transmissions initiated over the primary and secondary I/O channels in response to the specified signal pattern (which recorded values have been retrieved at step 610) conform to a predefined set of primary and secondary signal transmission values that are associated with the specified signal pattern. In an embodiment, the predefined set of primary and secondary signal transmission values associated with the specified signal pattern may be retrieved from a repository and may be compared against recorded signal values retrieved at step 610. In a particular embodiment of the invention, predefined secondary signal transmission values associated with the specified signal pattern are identical (or substantially identical) to predefined primary channel signal transmission values associated with the specified signal pattern.

Step 614 comprises assessing configuration or operation of the I/O device, of a combined I/O channel within the I/O device, of I/O points within the I/O device, or of individual primary and secondary I/O channels within the combined I/O channel—based on the determination at step 612.

In an embodiment, when step 612 results in a determination that the recorded values of signal transmissions (initiated over the primary and secondary I/O channels in response to the specified signal pattern) conform to a predefined set of primary and secondary signal transmission values that are associated with the specified signal pattern—step 614 would result in a determination that the combined I/O channel within the I/O device, I/O points corresponding to the combined I/O channel, and/or individual primary and secondary I/O channels within the combined I/O channel are configured or operating correctly.

In an embodiment, when step 612 results in a determination that the recorded values of signal transmissions (initiated over the primary and secondary I/O channels in response to the specified signal pattern) do not conform to a predefined set of primary and secondary signal transmission values that are associated with the specified signal pattern—step 614 would result in identification of a configuration error or an operating error (i.e. a determination that the combined I/O channel within the I/O device, I/O points corresponding to the combined I/O channel, and/or individual primary and secondary I/O channels within the combined I/O channel are configured or operating incorrectly).

The method of FIG. 6 is hereinafter further explained with reference to a configurable I/O device of the type illustrated in FIG. 5, wherein I/O points 502a to 502e are each configured to establish a digital output channel. For the purpose of this example, I/O points 502a and 502b have been configured to establish a first combined digital output channel—where the digital output channel corresponding to I/O point 502a is a primary output channel and the digital output channel corresponding to I/O point 502b is a secondary output channel. Digital output channels corresponding respectively to I/O points 502c, 502d and 502e have been combined into a second combined digital output channel—where the digital output channel corresponding to I/O point 502c is a primary output channel, and the digital output channels corresponding to I/O points 502d and 502e are secondary output channels.

In the embodiment under discussion, I/O points 502a to 502e are respectively configured to respond to an ON signal pattern by initiating transmission of a current of 0.67 amperes over each of the corresponding individual digital output channel. Accordingly, in response to an ON signal transmission initiated in respect of the first combined digital output channel, the I/O device should in normal operation initiate transmission of a current of 0.67 amperes over each digital output channel corresponding to I/O points 502a and 502b respectively, and a combined current of 1.3 amperes over the first combined digital output channel. Likewise, in response to an ON signal transmission initiated in respect of the second combined digital output channel, the I/O device should in normal operation initiate transmission of a current of 0.67 amperes over each digital output channel corresponding to I/O points 502c to 502e and a combined current of 2.0 amperes over the second combined digital output channel.

In response to an OFF signal transmission initiated in respect of the first combined digital output channel, the I/O device should in normal operation transmit a current of 0 amperes over each digital output channel corresponding to I/O points 502a and 502b respectively, and a combined current of 0 amperes over the first combined digital output channel. Likewise, in response to an OFF signal transmission initiated in respect of the second combined digital output channel, the I/O device should in normal operation transmit a current of 0 amperes over each digital output channel corresponding to I/O points 502c to 502e, and a combined current of 0 amperes over the second combined digital output channel.

Applying the testing method of FIG. 6 to the first and second combined digital output channels described above, step 602 comprises obtaining information corresponding to the combined I/O channels within the I/O device. In the embodiment under discussion, step 602 comprises obtaining identifiers corresponding to the first and second combined digital output channels, individual primary and secondary digital output channels (or I/O points) respectively corresponding to the first and second combined digital output channel values, and/or types of signals (and signal values corresponding to said signal patterns) that the first and second combined digital output channels are configured to transmit.

Step 604 comprises generating instructions for transmission of specified signal patterns over each of the first and second combined digital output channels. In an embodiment, each specified signal pattern may be selected or identified by an operator through a user interface coupled with validation engine 404.

For the purposes of the example under discussion, we may assume that the specified signal pattern for each of the first and second combined digital output channels is an ON signal. Responsive to the specified signal pattern within the instructions generated at step 604, step 606 comprises initiating transmission of a digital output signal over the first primary digital output channel corresponding to I/O point 502a, and of a digital output signal over the second primary digital output channel corresponding to I/O point 502c.

Step 608 comprises responding to the specified signal patterns received within the instructions generated at step 604, by initiating transmission of a digital output signal over a secondary digital output channel corresponding to I/O point 502b and over secondary digital output channels corresponding to each of I/O points 502d and 502e.

Step 610 comprises retrieving a record of signal transmissions initiated over each of digital output channels corresponding to I/O points 502a to 502e—which record of signal transmissions may have been generated through processor 306 and communication library 308 in response to signal transmissions initiated at I/O pints corresponding to each digital output channel corresponding to I/O points 502a to 502e.

At step 612, the recorded values of signal transmissions initiated over each digital output channel corresponding to I/O points 502a to 502e (which have been retrieved at step 610) are compared against a predefined set of primary and secondary signal transmission values associated with the specified signal pattern. Accordingly, in response to an ON signal pattern specified in connection with the first combined digital output channel (comprising individual digital output channels corresponding to I/O points 502a and 502b), step 612 comprises checking whether transmission of a current of 0.67 amperes (the predefined current value corresponding to an ON signal pattern) has been initiated over digital output channels corresponding to each of I/O points 502a and 502b. In the event the recorded values of signal transmissions initiated over digital output channels corresponding to I/O points 502a and 502b are found to be 0.67 amperes each, the assessment at step 614 would be that the first combined digital output channel is configured and/or operating correctly. In the event the recorded values of signal transmissions initiated over any one of the digital output channels corresponding to I/O points 502a and 502b are found not to be 0.67 amperes, the assessment at step 614 would be that the first combined digital output channel is configured and/or operating incorrectly.

Similarly, in response to an ON signal pattern specified in connection with the second combined digital output channel (comprising individual digital output channels corresponding to I/O points 502c to 502e), step 612 comprises checking whether a current of 0.67 amperes (the predefined current value corresponding to an ON signal pattern) has been recorded over digital output channels corresponding to each of I/O points 502c to 502e. In the event the recorded values of signal transmissions initiated over digital output channels corresponding to each of I/O points 502c to 502e are found to be 0.67 amperes each, the assessment at step 614 would be that the second combined digital output channel is configured and/or operating correctly. In the event the recorded values of signal transmissions initiated over any one of digital output channels corresponding to I/O points 502c to 502c are found not to be 0.67 amperes, the assessment at step 614 would be that the second combined digital output channel is configured and/or operating incorrectly.

In response to an OFF signal pattern specified in connection with the first combined digital output channel (comprising individual digital output channels corresponding to I/O points 502a and 502b), step 612 would comprise checking whether a current value of 0 amperes (the predefined current value corresponding to an OFF signal pattern) has been recorded in respect of digital output channels corresponding to each of I/O points 502a and 502b. In the event the recorded values of signal transmissions initiated over digital output channels corresponding to each of I/O points 502a and 502b are found to be 0 amperes each, the assessment at step 614 would be that the first combined digital output channel is configured and/or operating correctly. In the event the recorded values of signal transmissions initiated over any one of the digital output channels corresponding to I/O points 502a and 502b are found not to be 0 amperes, the assessment at step 614 would be that the first combined digital output channel is configured and/or operating incorrectly.

Similarly in response to an OFF signal pattern specified in connection with the second combined digital output channel (comprising individual digital output channels corresponding to I/O points 502c to 502e), step 612 comprises checking whether a current of 0 amperes (the predefined current value corresponding to an OFF signal pattern) has been recorded over digital output channels corresponding to each of I/O points 502c to 502e. In the event the recorded values of signal transmissions initiated over digital output channels corresponding to each of I/O points 502c to 502e are found to be 0 amperes each, the assessment at step 614 would be that the second combined digital output channel is configured and/or operating correctly. In the event the recorded values of signal transmissions initiated over any one of digital output channels corresponding to I/O points 502c to 502c are found not to be 0 amperes, the assessment at step 614 would be that the second combined digital output channel is configured and/or operating incorrectly.

In an embodiment of the invention, the instruction for transmission of a specified signal pattern at step 604 may comprise an instruction for transmission of a combination of specified signal patterns—for example, an ON signal pattern followed by an OFF signal pattern (or vice versa) which permits for additionally comprehensive testing of configuration or operation of combined I/O channels implemented at an I/O device.

Since the method for FIG. 6 relies on recording signal transmissions initiated over primary and secondary channels at the corresponding I/O point, the method enables testing of configuration and operation of the I/O device even where the primary and secondary channels have not been physically established with a field device (i.e. even before a corresponding field device has been connected to the I/O device over the primary and secondary channels).

Figure 7:
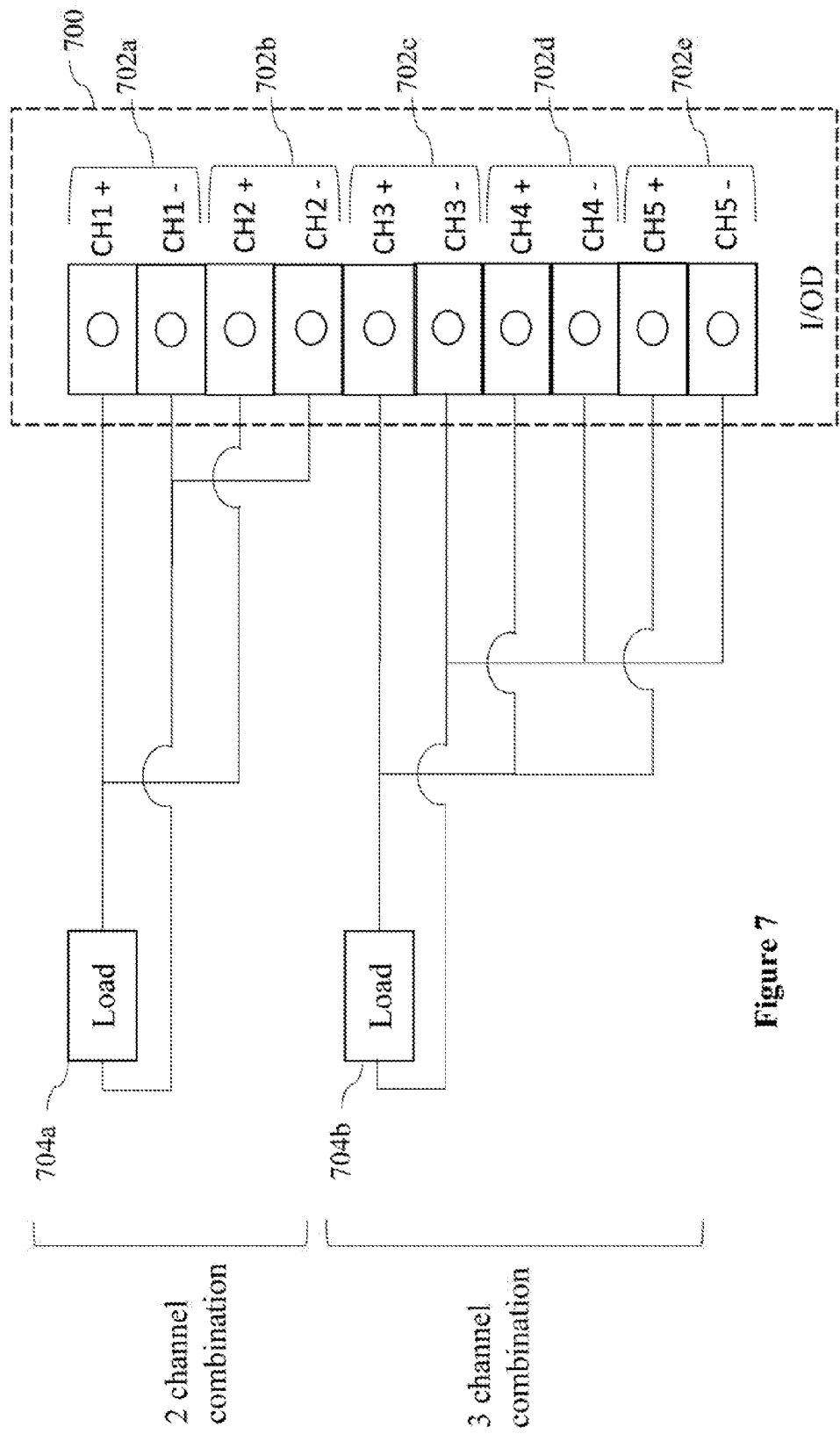

The illustration in FIG. 7 relates to another embodiment of the invention, where field devices have been appropriately connected to combined I/O channels implemented within an I/O device.

FIG. 7 illustrates an embodiment of a configurable I/O device 700 according to the present invention, wherein a plurality of I/O channels have been combined to generate combined I/O channels. In the illustrated embodiment, configurable I/O device 700 includes I/O points 702a to 702e. Each I/O point 702a to 702e may be used to establish a corresponding I/O channel between their respective positive terminal ends CH1+, CH2+, CH3+, CH4+ and CH5+ and their respective negative terminal ends CH1−, CH2−, CH3−, CH4− and CH5−. In the embodiment illustrated in FIG. 7, I/O points 702a and 702b and their corresponding I/O channels may be combined to establish a first combined I/O channel comprising two single I/O channels. Likewise, I/O points 702c, 702d and 702e may be combined to establish a second combined I/O channel comprising three single I/O channels. While the illustrated embodiment is limited to illustrations of dual-channel combinations and tri-channel combinations, it would be understood that the number of I/O channels that may be combined into a single combined I/O channel is a factor of the total number of available I/O channels within I/O device 700 and of the intended end use.

As illustrated in FIG. 7, the first combined I/O channel comprising I/O points 702a and 702b has load 704a disposed thereon, while the second combined I/O channel comprising I/O points 702c to 702e has load 704b disposed thereon.

FIG. 8 provides a flowchart illustrating a method of testing configuration and/or operation of an I/O device configured to implement first and second combined I/O channels as illustrated in FIG. 7, wherein the first and second combined I/O channels have been physically established with a field device.

For the purposes of the method illustrated in FIG. 8, it would be understood that steps 802 to 808 correspond materially to steps 602 to 608 of FIG. 6, and respectively comprise (i) obtaining information corresponding to a combined I/O channel within an I/O device (ii) generating an instruction for transmission of a specified signal pattern over the combined I/O channel (iii) initiating transmission of a primary I/O channel signal over a primary I/O channel within the combined I/O channel (iv) initiating transmission of secondary I/O channel signal(s) over each secondary I/O channel within the combined I/O channel.

Step 810 thereafter comprises determining whether signal value of a combined I/O signal received at a receiving device connected to the combined I/O channel conforms to a predefined combined signal value associated with the specified pattern. Alternatively (or in conjunction), step 810 may comprise determining whether signals received at a receiving device over each of the primary and secondary I/O channels associated with the combined I/O channel conform to a predefined set of primary and secondary I/O signals associated with the specified signal pattern. In a particular embodiment of the invention the value of signals received at the receiving device may be determined by one or more sensors provided within the receiving device. Readings corresponding to said signal values may be directly read from said sensors, or alternatively may be retrieved from a repository within which said signal values may have been stored by the receiving device. In a specific embodiment, a receiving device (or sensors within said receiving device) may be configured to record information corresponding to received signals, within a repository—which recording may be achieved by way of one or more of processor 306 and/or corresponding communication library 308 (or by way of other similar arrangements). The information corresponding to signals received at the receiving device may thereafter be retrieved from said repository for the purposes of the determination at step 810.

Step 812 comprises assessing configuration or operation of the I/O device, a combined I/O channel within the I/O device, I/O points corresponding to said combined I/O channel, or of individual primary and secondary I/O channels within the combined I/O channel—based on the determination at step 810.

In an embodiment, when step 810 results in a determination that (i) the combined signal received at a receiving device conforms to a predefined combined signal associated with the specified signal pattern and/or (ii) signals received at the receiving device over each of the primary and secondary channels associated with the combined channel conform to a predefined set of primary and secondary signals associated with the specified signal pattern—step 812 would result in a determination that the combined I/O channel within the I/O device and/or individual primary and secondary I/O channels within the combined I/O channel are configured or operating correctly.

In an embodiment, when step 810 results in a determination that (i) the combined signal received at a receiving device does not conform to a predefined combined signal associated with the specified signal pattern and/or (ii) signals received at the receiving device over each of the primary and secondary channels associated with the combined channel do not conform to a predefined set of primary and secondary signals associated with the specified signal pattern—step 812 would result in a determination that the combined I/O channel within the I/O device and/or individual primary and secondary I/O channels within the combined I/O channel are configured or operating incorrectly.

The method of FIG. 8 is hereinafter further explained with reference to a configurable I/O device of the type illustrated in FIG. 7, wherein I/O points 702a to 702e are each configured to establish a digital output channel. For the purposes of the example, I/O points 702a and 702b have been configured to establish a first combined digital output channel—where the digital output channel corresponding to I/O point 702a is a primary output channel and the digital output channel corresponding to I/O point 702b is a secondary output channel. Digital output channels corresponding respectively to I/O points 702c, 702d and 702e have been combined into a second combined digital output channel—where the digital output channel corresponding to I/O point 702c is a primary output channel, and the digital output channels corresponding to I/O points 702d and 702e are secondary output channels.

In the embodiment under discussion, I/O points 702a to 702e are respectively configured to respond to an ON signal pattern by initiating transmission of a current of 0.67 amperes over the corresponding individual digital output channel. Accordingly, in response to an ON signal transmission initiated in respect of the first combined digital output channel, the I/O device should in normal operation transmit a current of 0.67 amperes over each digital output channel corresponding to I/O points 702a and 702b respectively, and a combined current of 1.3 amperes over the first combined digital output channel. Likewise, in response to an ON signal transmission initiated in respect of the second combined digital output channel, the I/O device should in normal operation initiate transmission of a current of 0.67 amperes over each digital output channel corresponding to I/O points 702c to 702e and a combined current of 2.0 amperes over the second combined digital output channel.

In response to an OFF signal transmission initiated in respect of the first combined digital output channel, the I/O device should in normal operation transmit a current of 0 amperes over each digital output channel corresponding to I/O points 702a and 702b respectively, and a combined current of 0 amperes over the first combined digital output channel. Likewise, in response to an OFF signal transmission initiated in respect of the second combined digital output channel, the I/O device should in normal operation transmit a current of 0 amperes over each digital output channel corresponding to I/O points 702c to 702e, and a combined current of 0 amperes over the second combined digital output channel.

Applying the testing method of FIG. 8 to the first and second combined digital output channels described above, step 802 comprises obtaining information corresponding to the combined I/O channels within the I/O device. In the embodiment under discussion, step 802 comprises obtaining identifiers corresponding to the first and second combined digital output channels, individual primary and secondary digital output channels respectively corresponding to the first and second combined digital output channel values, and/or types of signals (and signal values corresponding to said signal patterns) that the first and second combined digital output channels are configured to transmit.

Step 804 comprises generating instructions for transmission of specified signal patterns over each of the first and second combined digital output channels. In an embodiment, each specified signal pattern may be selected or identified by an operator through a user interface coupled with validation engine 404. For the purposes of the example under discussion, we may assume that the specified signal pattern for each of the first and second combined digital output channels is an ON signal.

Responsive to the specified signal patterns within the instructions generated at step 804, step 806 comprises initiating transmission of a digital output signal over the first primary digital output channel corresponding to I/O point 702a, and of a digital output signal over the second primary digital output channel corresponding to I/O point 702c.

Step 808 comprises responding to the specified signal patterns received within the instructions generated at step 804, by initiating transmission of a digital output signal over a secondary digital output channel corresponding to I/O points 802b and over secondary digital output channels corresponding to each of I/O points 802d and 802e.

Step 810 comprises determining either or both of (i) whether signal value of a combined I/O signal received at a receiving device connected to a combined I/O channel conforms to a predefined combined signal value associated with the specified pattern and/or (ii) whether signals received at a receiving device over each of the primary and secondary I/O channels associated with the combined I/O channel conform to a predefined set of primary and secondary I/O signals associated with the specified signal pattern.

Accordingly, in response to an ON signal pattern specified in connection with the first combined digital output channel (comprising individual digital output channels 702a and 702b) the step 810 determination may comprise either or both of (i) checking whether signal value of a combined I/O signal received at the receiving device (e.g. field device) connected to the first combined digital output channel is 1.3 amperes (which is the predefined combined signal value associated with the specified ON signal pattern) and/or (ii) checking whether signals received at the receiving device (field device) over each of primary and secondary digital output channels 702a and 702b is 0.67 amperes (which is the predefined value for signal transmission over individual digital output channels that is associated with the specified ON signal pattern).

Responsive to a determination that the signal value of the combined I/O signal received at the field device over the first combined digital output channel is 1.3 amperes and/or that the signal received at the field device over each of the primary and secondary digital output channels 702a and 702b is 0.67 amperes, the assessment at step 812 would be that the first combined digital output channel is configured and/or operating correctly. Responsive to a determination that the signal value of the combined I/O signal received at the field device over the first combined digital output channel is not 1.3 amperes and/or the signals received at the field device over each of the primary and secondary digital output channels 702a and 702b is not 0.67 amperes, the assessment at step 812 would be that the first combined digital output channel is configured and/or operating incorrectly.

Likewise, in response to an ON signal pattern specified in connection with the second combined digital output channel (comprising individual digital output channels 702c to 702e) the step 810 determination may comprise either or both of (i) checking whether signal value of a combined I/O signal received at the receiving device (e.g. field device) connected to the second combined digital output channel is 2 amperes (which is the predefined combined signal value associated with the specified ON signal pattern) and/or (ii) checking whether signals received at the receiving device (e.g. field device) over each of the primary and secondary digital output channels 702c to 702e is 0.67 amperes (which is the predefined value for signal transmission over individual digital output channels that is associated with the specified ON signal pattern).

Responsive to a determination that the signal value of the combined I/O signal received at the field device over the second combined digital output channel is 2 amperes and/or the signals received at the field device over each of the primary and secondary digital output channels 702c to 702e is 0.67 amperes, the assessment at step 812 would be that the second combined digital output channel is configured and/or operating correctly. Responsive to a determination that the signal value of the combined I/O signal received at the field device over the second combined digital output channel is not 2 amperes and/or the signals received at the field device over each of the primary and secondary digital output channels 702c to 702e is not 0.67 amperes, the assessment at step 812 would be that the second combined digital output channel is configured and/or operating incorrectly.

Similarly, in response to an OFF signal pattern specified in connection with the first combined digital output channel (comprising individual digital output channels 702a and 702b) the step 810 determination may comprise either or both of (i) checking whether signal value of a combined I/O signal received at the receiving device (e.g. field device) connected to the first combined digital output channel is 0 amperes (which is the predefined combined signal value associated with the specified ON signal pattern) and/or (ii) checking whether signals received at the receiving device (field device) over each of the primary and secondary digital output channels 702a and 702b is 0 amperes (which is the predefined value for signal transmission over individual digital output channels that is associated with the specified ON signal pattern).

Responsive to a determination that the signal value of the combined I/O signal received at the field device over the first combined digital output channel is 0 amperes and/or the signals received at the field device over each of the primary and secondary digital output channels 702a and 702b is 0 amperes, the assessment at step 812 would be that the first combined digital output channel is configured and/or operating correctly. Responsive to a determination that the signal value of the combined I/O signal received at the field device over the first combined digital output channel is not 0 amperes and/or the signals received at the field device over each of the primary and secondary digital output channels 702a and 702b is not 0 amperes, the assessment at step 812 would be that the first combined digital output channel is configured and/or operating incorrectly.

Likewise, in response to an OFF signal pattern specified in connection with the second combined digital output channel (comprising individual digital output channels 702c to 702e) the step 810 determination may comprise either or both of (i) checking whether signal value of a combined I/O signal received at the receiving device (e.g. field device) connected to the second combined digital output channel is 0 amperes (which is the predefined combined signal value associated with the specified ON signal pattern) and/or (ii) checking whether signals received at the receiving device (field device) over each of the primary and secondary digital output channels 702c to 702e is 0 amperes (which is the predefined value for signal transmission over individual digital output channels that is associated with the specified ON signal pattern).

Responsive to a determination that the signal value of the combined I/O signal received at the field device over the second combined digital output channel is 0 amperes and/or the signals received at the field device over each of the primary and secondary digital output channels 702c to 702e is 0 amperes, the assessment at step 812 would be that the second combined digital output channel is configured and/or operating correctly. Responsive to a determination that the signal value of the combined I/O signal received at the field device over the second combined digital output channel is not 0 amperes and/or the signals received at the field device over each of the primary and secondary digital output channels 702c to 702e is not 0 amperes, the assessment at step 812 would be that the second combined digital output channel is configured and/or operating incorrectly.

FIG. 9 comprises a flow chart for executing confirmatory testing of one or more combined I/O channels—which confirmatory testing may in an embodiment of the invention, be carried out only in response to a prior finding (in accordance with the methods previously described in connection with FIG. 6 or 8) that the one or more combined I/O channels and individual channels within said combined I/O channels are configured or operating correctly.

As illustrated in FIG. 9, step 902 comprises executing signal pattern testing (i.e. one or more methods of testing that have been described previously in connection with FIGS. 6 and 8) to ascertain whether the I/O device is configured or operating correctly with respect to a combined I/O channel configured within said I/O device.

Responsive to determining at step 902 that the I/O device (or a combined I/O channel within said I/O device) is configured or operating correctly, step 904 comprises executing at least one of (i) fallback testing and/or (ii) disconnection detection testing, on the primary I/O channel associated with a combined I/O channel within the I/O device. Step 906 comprises determining whether the combined I/O channel and/or the I/O device are configured or operating correctly based on the results of the testing at step 904. In an embodiment of the invention, the step 906 determination is based solely on the results of the testing at step 904 (i.e. testing of the primary I/O channel within a combined I/O channel), and independent of whether said fallback testing or disconnection detection testing is additionally carried out on the secondary I/O channels associated with a combined I/O channel (or independent of the results of testing on the secondary I/O channels).

Briefly, for the purposes of the present invention, fallback testing comprises checking whether an I/O device responds to a failure state by changing the value of a signal being transmitted over an I/O channel to a predetermined fallback value. For example, an exemplary digital output channel that is configured to output a current signal of 0.67 amperes in response to an ON signal and a 0 ampere signal in response to an OFF signal, may be configured to output a predefined fallback current signal of 0.4 amperes in response to a detected failure state, and to maintain this fallback signal until the failure state is rectified. Fallback testing of this exemplary digital output channel would comprise determining the output signal value across said digital output channel in response to a simulated failure state—in which case a detected fallback current signal of 0.4 amperes would establish that the digital output channel is configured or operating correctly, whereas a detected fallback current signal other than 0.4 amperes would establish that the I/O device, I/O points within the I/O device, or combined I/O channel implemented at said I/O device is configured or operating incorrectly.

Likewise, for the purposes of the present invention, disconnection detection testing comprises physically disconnecting or disabling an I/O channel and checking whether the I/O device detects the disconnection. A detected disconnection in response to actual physical disconnection of an I/O channel establishes that the I/O device, I/O points within the I/O device, or combined I/O channel implemented at said I/O device is configured or operating correctly, while a failure to detect disconnection despite an actual physical disconnection of the I/O channel would establish that the I/O device, I/O points within the I/O device, or combined I/O channel implemented at said I/O device is configured or operating incorrectly.

In a preferred embodiment of the method described in connection with FIG. 9, the step 906 determination (i.e. whether a combined I/O channel, corresponding I/O points or an I/O device implementing the combined I/O channel is configured or operating correctly) is based on one or more of fallback testing or detection testing carried out only in respect of a primary I/O channel associated with a combined I/O channel (and without reliance on any fallback testing or disconnection detection testing of one or more secondary I/O channels within the combined I/O channel). For example, applying the method of FIG. 9 to I/O devices 500 and 700 (of FIGS. 5 and 7 respectively), a confirmatory determination regarding configuration or operation of combined I/O channels within said devices may be arrived at based on fallback testing and/or disconnection detection testing of only the primary I/O channels (i.e. I/O channels corresponding to I/O points 502a, 502c, 702a or 702c) and without regard to fallback testing and/or disconnection detection testing of any secondary I/O channels (i.e. I/O channels corresponding to I/O points 502b, 502d, 502e, 702a, 702d or 702e).

FIG. 10 illustrates an exemplary computing system for implementing the present invention.

The system 1002 comprises at least one processor 1004 and at least one memory 1006. The processor 1004 executes program instructions and may be a real processor. The processor 1004 may also be a virtual processor. The computer system 1002 is not intended to suggest any limitation as to scope of use or functionality of described embodiments. For example, the computer system 1002 may include, but not be limited to, one or more of a general-purpose computer, a programmed microprocessor, a micro-controller, an integrated circuit, and other devices or arrangements of devices that are capable of implementing the steps that constitute the method of the present invention. Exemplary embodiments of a system 1002 in accordance with the present invention may include one or more servers, desktops, laptops, tablets, smart phones, mobile phones, mobile communication devices, tablets, phablets and personal digital assistants. In an embodiment of the present invention, the memory 1006 may store software for implementing various embodiments of the present invention. The computer system 1002 may have additional components. For example, the computer system 1002 may include one or more communication channels 1008, one or more input devices 1010, one or more output devices 1012, and storage 1014. An interconnection mechanism (not shown) such as a bus, controller, or network, interconnects the components of the computer system 1002. In various embodiments of the present invention, operating system software (not shown) provides an operating environment for various softwares executing in the computer system 1002 using a processor 1004, and manages different functionalities of the components of the computer system 1002.

The communication channel(s) 1008 allow communication over a communication medium to various other computing entities. The communication medium provides information such as program instructions, or other data in a communication media. The communication media includes, but is not limited to, wired or wireless methodologies implemented with an electrical, optical, RF, infrared, acoustic, microwave, Bluetooth or other transmission media.

The input device(s) 1010 may include, but is not limited to, a touch screen, a keyboard, mouse, pen, joystick, trackball, a voice device, a scanning device, or any another device that is capable of providing input to the computer system 1002. In an embodiment of the present invention, the input device(s) 1010 may be a sound card or similar device that accepts audio input in analog or digital form. The output device(s) 1012 may include, but not be limited to, a user interface on CRT, LCD, LED display, or any other display associated with any of servers, desktops, laptops, tablets, smart phones, mobile phones, mobile communication devices, tablets, phablets and personal digital assistants, printer, speaker, CD/DVD writer, or any other device that provides output from the computer system 1002.

The storage 1014 may include, but not be limited to, magnetic disks, magnetic tapes, CD-ROMs, CD-RWs, DVDs, any types of computer memory, magnetic stripes, smart cards, printed barcodes or any other transitory or non-transitory medium which can be used to store information and can be accessed by the computer system 1002. In various embodiments of the present invention, the storage 1014 may contain program instructions for implementing any of the described embodiments.

In an embodiment of the present invention, the computer system 1002 is part of a distributed network or a part of a set of available cloud resources.

The present invention may be implemented in numerous ways including as a system, a method, or a computer program product such as a computer readable storage medium or a computer network wherein programming instructions are communicated from a remote location.

The present invention may suitably be embodied as a computer program product for use with the computer system 1002. The method described herein is typically implemented as a computer program product, comprising a set of program instructions which is executed by the computer system 1002 or any other similar device. The set of program instructions may be a series of computer readable codes stored on a tangible medium, such as a computer readable storage medium (storage 1014), for example, diskette, CD-ROM, ROM, flash drives or hard disk, or transmittable to the computer system 1002, via a modem or other interface device, over either a tangible medium, including but not limited to optical or analogue communications channel(s) 1008. The implementation of the invention as a computer program product may be in an intangible form using wireless techniques, including but not limited to microwave, infrared, Bluetooth or other transmission techniques. These instructions can be preloaded into a system or recorded on a storage medium such as a CD-ROM, or made available for downloading over a network such as the Internet or a mobile telephone network. The series of computer readable instructions may embody all or part of the functionality previously described herein.

In addition to the above, it would be understood that in the case of any configurable I/O devices 300 (as illustrated in FIGS. 3 and 4) (i) an input component of said I/O device may comprise one or more signal conditioning or signal conversion circuits, which enable conditioning and/or conversion of data signals received from a field device into logic signals capable of interpretation by the corresponding controller, and (ii) an output component of said I/O device may comprise one or more signal conversion circuits configured to convert control signals from the controller into digital or analog signals that can be used to control various field devices.

It will be understood that methods, systems and computer program products in accordance with the present invention provide an efficient and effective solution to enable concurrent testing of multiple I/O channels within a combined I/O channel of a configurable I/O device, while avoiding the requirement for manual signal testing, and manual comparison and analysis of detected signal values. Particularly advantageously, the present invention enables testing of a configurable I/O device without having to complete the process of connecting a field device to the combined I/O channel—thereby enabling an operator to test and configure I/O devices in the early stages of setting up an industrial control system, without having to wait for complete installation and set-up of all field devices associated with the I/O device.

While the exemplary embodiments of the present invention are described and illustrated herein, it will be appreciated that they are merely illustrative. It will be understood by those skilled in the art that various modifications in form and detail may be made therein without departing from or offending the spirit and scope of the invention as defined by the appended claims.

The invention claimed is:

1. A method of detecting a configuration error or operating error corresponding to an input/output (I/O) device comprising a plurality of I/O points configured to establish a combined I/O channel between said I/O device and a field device, said combined I/O channel comprising a primary I/O channel and at least one secondary I/O channel, the method comprising:

receiving an instruction for transmission of a specified signal pattern over the combined I/O channel, the specified signal pattern being determinative of signals transmitted over each I/O channel within the combined I/O channel, and all of the primary and secondary I/O channels within the combined I/O channel having one terminating I/O point in at least one of said I/O device and said field device;

responsive to the specified signal pattern:

initiating at an I/O point associated with the primary I/O channel within the combined I/O channel, transmission of a primary channel signal over the primary I/O channel;

for each secondary I/O channel within the combined I/O channel, initiating at an I/O point associated with said secondary channel, transmission of a secondary channel signal over said secondary I/O channel;

receiving a record of signal transmissions initiated or received over the combined I/O channel in response to the specified signal pattern;

comparing current values within the received record of signal transmissions against a predefined set of current values associated with the specified signal pattern; and detecting a configuration error or operating error based on results of the comparison of current values.

2. The method as claimed in claim 1, wherein:

the received record of signal transmissions comprises a record of signal transmissions (i) initiated at the I/O point associated with the primary I/O channel within the combined I/O channel and (ii) initiated at each I/O point associated with a secondary channel within the combined I/O channel; and the predefined set of current values associated with the specified signal pattern comprises a primary I/O channel signal value and at least one secondary I/O channel signal value respectively associated with the specified signal pattern.

3. The method as claimed in claim 1, wherein:

the received record of signal transmissions comprises a record of signal transmissions received at a receiving device (i) over the primary I/O channel within the combined I/O channel and (ii) over each secondary channel within the combined I/O channel; and the predefined set of current values associated with the specified signal pattern comprises a primary I/O channel signal value and at least one secondary I/O channel signal value respectively associated with the specified signal pattern.

4. The method as claimed in claim 1, wherein:

the received record of signal transmissions comprises a record of a signal transmission received at a receiving device over the combined I/O channel; and the predefined set of current values associated with the specified signal pattern comprises a combined I/O channel signal value associated with the specified signal pattern.

5. The method as claimed in claim 1, wherein the record of signal transmissions is generated:

by the I/O device responsive to initiating transmission of signals over primary or secondary I/O channels within the combined I/O channel; or by a receiving device responsive to receiving signals transmitted over primary or secondary I/O channels within the combined I/O channel.

6. The method as claimed in claim 1, wherein the instruction for transmission of the specified signal pattern is received at an operator interface.

7. The method as claimed in claim 1, wherein the I/O device is configured such that:

each of the primary and secondary I/O channels within the combined I/O channel comprise a digital output channel; and the combined I/O channel comprises a combined digital output channel.

8. The method as claimed in claim 7, wherein:

the signals delivered by the combined I/O channel and the primary and secondary I/O channels within said combined I/O channel are current signals.

9. The method as claimed in claim 1, further comprising:

detecting a configuration error or operating error based on results of at least one of fallback testing or disconnection detection testing executed on the primary I/O channel within the combined I/O channel, wherein said detection of configuration error or operating error is independent of fallback testing and disconnection testing executed on any secondary I/O channel within the combined I/O channel.

10. A system for detecting a configuration error or operating error corresponding to an input/output (I/O) device, comprising:

an I/O device comprising a plurality of I/O points configured to establish a combined I/O channel between said I/O device and a field device, said combined I/O channel comprising a primary I/O channel and at least one secondary I/O channel; and a validation engine configured to:

receive an instruction for transmission of a specified signal pattern over the combined I/O channel, the specified signal pattern being determinative of signals transmitted over each I/O channel within the combined I/O channel, and all of the primary and secondary I/O channels within the combined I/O channel having one terminating I/O point in said I/O device or having one terminating I/O point in said field device;

responsive to the specified signal pattern:

initiate at an I/O point associated with the primary I/O channel within the combined I/O channel, transmission of a primary channel signal over the primary I/O channel;

for each secondary I/O channel within the combined I/O channel, initiate at an I/O point associated with said secondary channel, transmission of a secondary channel signal over said secondary I/O channel;

receive a record of signal transmissions initiated or received over the combined I/O channel in response to the specified signal pattern;

compare current values within the received record of signal transmissions against a predefined set of current values associated with the specified signal pattern; and detect a configuration error or operating error based on results of the comparison of current values.

11. The system as claimed in claim 10, wherein:

the received record of signal transmissions comprises a record of signal transmissions (i) initiated at the I/O point associated with the primary I/O channel within the combined I/O channel and (ii) initiated at each I/O point associated with a secondary channel within the combined I/O channel; and the predefined set of current values associated with the specified signal pattern comprises a primary I/O channel signal value and at least one secondary I/O channel signal value respectively associated with the specified signal pattern.

12. The system as claimed in claim 10, wherein:

the received record of signal transmissions comprises a record of signal transmissions received at a receiving device (i) over the primary I/O channel within the combined I/O channel and (ii) over each secondary channel within the combined I/O channel; and the predefined set of current values associated with the specified signal pattern comprises a primary I/O channel signal value and at least one secondary I/O channel signal value respectively associated with the specified signal pattern.

13. The system as claimed in claim 10, wherein:
the received record of signal transmissions comprises a record of a signal transmission received at a receiving device over the combined I/O channel; and
the predefined set of current values associated with the specified signal pattern comprises a combined I/O channel signal value associated with the specified signal pattern.

14. The system as claimed in claim 10, wherein the record of signal transmissions is generated:
by the I/O device responsive to initiating transmission of signals over primary or secondary I/O channels within the combined I/O channel; or
by a receiving device responsive to receiving signals transmitted over primary or secondary I/O channels within the combined I/O channel.

15. The system as claimed in claim 10, wherein the instruction for transmission of the specified signal pattern is received at an operator interface.

16. The system as claimed in claim 10, wherein the I/O device is configured such that:
each of the primary and secondary I/O channels within the combined I/O channel comprise a digital output channel; and
the combined I/O channel comprises a combined digital output channel.

17. The system as claimed in claim 16, wherein
the signals delivered by the combined I/O channel and the primary and secondary I/O channels within said combined I/O channel are current signals.

18. The system as claimed in claim 10, further comprising:
detecting a configuration error or operating error based on results of at least one of fallback testing or disconnection detection testing executed on the primary I/O channel within the combined I/O channel, wherein said detection of configuration error or operating error is independent of fallback testing and disconnection testing executed on any secondary I/O channel within the combined I/O channel.

19. A computer program product comprising a non-transitory computer readable medium having computer readable instruction embodied therein for detecting a configuration error or operating error corresponding to an input/output (I/O) device comprising a plurality of I/O points configured to establish a combined I/O channel between said I/O device and a field device, said combined I/O channel comprising a primary I/O channel and at least one secondary I/O channel, the computer readable instructions comprising instructions for:
receiving an instruction for transmission of a specified signal pattern over the combined I/O channel, the specified signal pattern being determinative of signals transmitted over each I/O channel within the combined I/O channel, and all of the primary and secondary I/O channels within the combined I/O channel having one terminating I/O point in said I/O device or having one terminating I/O point in said field device;
responsive to the specified signal pattern:
initiating at an I/O point associated with the primary I/O channel within the combined I/O channel, transmission of a primary channel signal over the primary I/O channel;
for each secondary I/O channel within the combined I/O channel, initiating at an I/O point associated with said secondary channel, transmission of a secondary channel signal over said secondary I/O channel;
receiving a record of signal transmissions initiated or received over the combined I/O channel in response to the specified signal pattern;
comparing current values within the received record of signal transmissions against a predefined set of current values associated with the specified signal pattern; and
detecting a configuration error or operating error based on results of the comparison of current values.

* * * * *